3,153,564
DISPERSING DISPERSED ACETATE DYES AND A LIGNIN SULFONATE ALKYL NAPHTHALENE SULFONATE AND SULFO CARBOXYLIC ACID ALKYL ESTER MIXTURE THEREFOR
Jack F. Morgan, Delmar, N.Y., assignor to General Aniline & Film Corporation, New York, N.Y., a corporation of Delaware
No Drawing. Filed Jan. 25, 1962, Ser. No. 168,805
3 Claims. (Cl. 8—83)

This invention relates to an improved method of dispersing dyes and to the dispersed dyes thus produced.

Dispersed dyes (sometimes referred to as acetate dyes), i.e., organic colors which are applied from near colloidal aqueous dispersions to textile fibers are used extensively for application to synthetic fibers such as cellulose acetate, nylon, polyester fibers, and the like.

Ligninsulfonic acid is extensively used as a dispersing agent for dispersed dyes. While a number of dyes are satisfactorily dispersed with this dispersant, there are certain dyes with which it is unsatisfactory. In particular, certain dispersed dyes have poor dispersibility in cold water as well as slow wet-out in cold water, both of which are disadvantageous since ease of dispersibility and rapid wet-out in cold water allows easier and more rapid handling by the dyer.

A further disadvantage with certain dispersed dyes is that if the dye is poorly dispersed it is difficult to filter, especially if drying is to be performed in separate equipment and it is therefore sometimes difficult to transfer the dye paste to the drying equipment. In fact a convenient test for the dispersibility of a dispersed dye consists in filtering an aqueous dispersion of the dye wherein poor dispersibility will be evidenced by specks or dots on the filter paper.

The process of the present invention is particularly applicable to preparation of dispersed dyes which are difficult to disperse; however, it may also be used with those disperse dyes which are known to be easily dispersed and for uniform practice in the manufacture of dispersed colors the use of the process of the present invention on both dyes which are easily dispersed and those that are difficult to disperse may be advantageous.

The dispersed dyes are well known in the art, a number of diazo dyes of this type being disclosed in Lubs, "The Chemistry of Synthetic Dyes and Pigment," ASC Monograph No. 127, page 167 et seq., and in Venkataraman, "Chemistry of Synthetic Dyes," Academic Press, New York, 1952, page 639 et seq. Typical anthraquinone dispersed dyes with which the process of the present invention may be used are disclosed in Lubs, page 417 et seq., and in Venkataraman, page 803 et seq.

The dyestuff of the formula:

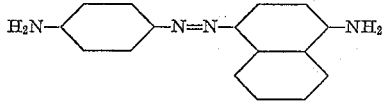

was dispersed with ligninsulfonic acid in the conventional manner but the dispersed dye was not sufficiently dispersible in cold water, and the cold water dispersion could not be filtered through ordinary filters.

An attempt was made to improve the dispersibility by including an alkyl naphthalenesulfonate. This improved the dispersibility somewhat.

Likewise an alkyl ester of a sulfoalkyl di- or tricarboxylic acid was employed along with the ligninsulfonic acid as dispersants and gave somewhat improved dispersibility.

But when a mixture of the alkyl naphthalenesulfonic acid, an alkyl ester of a sulfo alkyl di- or tri-carboxylic acid, and the ligninsulfonic acid were employed jointly as a dispersing system, the dispersibility was unexpectedly improved far beyond what would have been expected from employing ligninsulfonic acid alone or in combination with either of the other two dispersing agents. When this system of dispersing agents is employed to disperse dyes, the dyes disperse and wet-out readily in cold water, and the cold water solutions filter easily. There appears to be a synergistic effect resulting from the combination of these three particular types of dispersing agents towards improving the dispersibility of dyes.

In practicing the present invention 100 parts by weight of the dye to be dispersed is compounded with the conventional amount of a water soluble ligninsulfonate, i.e., 25 to 150 parts by weight of a water soluble ligninsulfonate dispersing agent, (the precise amount of ligninsulfonate depending primarily on the ease with which the particular dye in question is dispersed) and in addition to the ligninsulfonate about 0.5 to 8 parts by weight of an alkylnaphthalene sulfonate, and in addition thereto from about 0.5 to 8 parts by weight of an alkyl ester of a sulfo di- or tri-carboxylic acid.

Water soluble ligninsulfonates employed for the purpose of this invention are, for example, the sodium, calcium, and magnesium salts of ligninsulfonic acid and also of partly desulfonated ligninsulfonate acid such as those disclosed in U.S. Patent 2,371,136. Such materials are well known and commercially available and are sold for example under trade names Daxad 23 and Polyfon H (sodium ligninsulfonates), Marasperse C (calcium ligninsulfonate), Marasperse N (sodium ligninsulfonate), Marasperse CB (partly desulfonated calcium ligninsulfonate), Darvan 2 (purified sodium ligninsulfonate), and Maratan A and Super Spruce (magnesium ligninsulfonates), Likewise the alkyl naphthalene sulfonates are well known in the art. These are used in the form of their alkali metal (usually sodium) or ammonium salt. Specific compounds of this type are disclosed in Schwartz and Perry, Surface Active Agents, Interscience Publishing, New York (1949), pp. 116–119, and include mono- and di-propyl- and butyl-naphthalene sulfonates.

The alkyl esters of sulfo-alkyl di- and tri-carboxylic acids which may be used in accordance with the present invention are also well known in the art and are described for example in U.S. Patents 2,028,091, 2,176,423, and 2,315,375. These are used in the form of their alkali metal (usually sodium) or ammonium salt. A number of specific compounds of this type are disclosed in Young and Coons, Surface Active Agents, Chemical Publishing Co. (1945), pp. 102–108.

Details of the present invention will be apparent to those skilled in the art from a consideration of the following specific examples of preferred embodiments thereof. It is to be understood, however, that these examples are merely illustrative of the invention and are not to be considered as limiting the invention.

Example I

Sixty-five parts of the dye of the formula:

$$H_2N-\langle\phantom{x}\rangle-N=N-\langle\phantom{x}\rangle-NH_2$$

are blended wet in a mixer with 35 parts of sodium ligninsulfonate, 2.5 parts of sodium salt of diisobutyl napthalene sulfonic acid, and 4 parts of sodium salt of diisobutyl carbinol diester of sulfosuccinic acid. The mixture is viscous blended until tests indicate complete dispersion. After drying and milling, the product is outstanding in a cold water dispersion test carried out as follows:

Four g. of the dry dispersed dye is stirred into 100 cc. of water at room temperature, and filtered through an 80 square muslin filter on a 10 cm. suction filter. No undispersed dye is retained on the muslin.

Three additional dispersions were made as follows:

A. Dye was dispersed as above, employing as sole dispersing agent 35 parts of sodium ligninsulfonate.

B. Dye was dispersed as above, employing 35 parts of sodium ligninsulfonate and 2.5 parts of sodium salt of diisobutyl-naphthalene sulfonic acid as a dispersing system.

C. Dye was dispersed as above, employing 35 parts of sodium ligninsulfonate and 4 parts of sodium salt of diisobutyl carbinol diester of sulfosuccinic acid as a dispersing system.

In the cold water dispersion tests, B and C showed some improvement over A, but in no case did the tests compare favorably with the test made employing the disperse dye which had been dispersed with the tri-dispersing agent system.

Example II

Fifty parts of the dye of the formula:

$$CH_3CONH-\langle\phantom{x}\rangle-N=N-\langle\phantom{x}\rangle\begin{smallmatrix}OH\\\\CH_3\end{smallmatrix}$$

are blended as in Example I with 43 parts of sodium ligninsulfonate, 0.6 part of sodium salt of diisobutyl-naphthalene sulfonic acid, and 1.0 part of sodium salt of diisobutyl carbinol diester of sulfosuccinic acid. Excellent cold water dispersion tests are obtained from this material.

Three additional dispersions were made as follows:

A. 50 parts of the dye of this example were dispersed employing as sole dispersing agent 43 parts of sodium ligninsulfonate.

B. 50 parts of the dye of this example were dispersed employing 43 parts of sodium ligninsulfonate and 0.6 part of sodium salt of diisobutyl-naphthalene sulfonic acid as a dispersing system.

C. 50 parts of the dye of this example were dispersed employing 43 parts of sodium ligninsulfonate and 1.0 part of sodium salt of diisobutyl carbinol diester of sulfosuccinic acid.

In the cold water dispersion tests, B and C showed some improvement over A, but in no case did the tests compare favorably with the test made employing the disperse dye which had been dispersed with the tri-dispersing agent system.

Example III

Fifty parts of the dye of the formula:

$$\begin{smallmatrix}O&NH_2\\&&-OCH_3\\O&OH\end{smallmatrix}$$ (anthraquinone structure)

are blended as in Example I with 35 parts of sodium ligninsulfonate, 0.4 part of sodium salt of diisobutyl-naphthalene sulfonic acid, and 0.8 part of sodium salt of diisobutyl carbinol diester of sulfosuccinic acid. Excellent cold water dispersion tests are obtained with the dye dispersed in this manner.

Example IV

Fifty parts of the dye of the formula:

$$O_2N-\langle\phantom{x}\rangle-N=N-C\underset{HOC}{\underset{\|}{\phantom{x}}}\phantom{x}\overset{C=CH_3}{\underset{N}{\|}}$$
(with N-phenyl-Cl substituent)

are dispersed in the manner of Example I with 43 parts of sodium ligninsulfonate, 0.6 part of sodium salt of diisobutyl-naphthalene sulfonic acid, and 1.0 part of sodium salt of diisobutyl carbinol diester of sulfosuccinic acid. The dispersed dye gives excellent cold water dispersion tests.

Example V

Sixty-five parts of the dye of the formula:

$$\langle\phantom{x}\rangle-N=N-\langle\phantom{x}\rangle-N=N-\langle\phantom{x}\rangle-OH$$

are dispersed in the manner of Example I with 35 parts of sodium ligninsulfonate, 2.5 parts of sodium salt of diisobutyl-naphthalene sulfonic acid, and 4 parts of sodium salt of diisobutyl carbinol diester of sulfosuccinic acid. The dispersed dye gives excellent cold water dispersion tests.

Example VI

Fifty parts of the dye of the formula:

$$\begin{smallmatrix}&&O\\&N=N-&\\&&-HO-\\NO_2&&CH_3\end{smallmatrix}$$

are dispersed in the manner of Example I with 43 parts of sodium ligninsulfonate, 0.6 part of sodium salt of diisobutyl-naphthalene sulfonic acid, and 1.0 part of sodium salt of diisobutyl carbinol diester of sulfosuccinic acid. The dispersed dye gives excellent cold water dispersing tests.

Example VII

Fifty parts of the dye of the formula:

$$H_2N-\langle\phantom{x}\rangle-N=N-\langle\phantom{x}\rangle-N(CH_2CH_2OH)_2$$
(with CH_3 substituent)

are dispersed in the manner of Example I with 43 parts of sodium ligninsulfonate, 0.6 part of sodium salt of diisobutyl-naphthalene sulfonic acid, and 1.0 part of sodium salt of diisobutyl carbinol diester of sulfosuccinic acid. The dispersed dye gives excellent cold water dispersing tests.

Example VIII

Fifty parts of the dye of the formula:

$$\begin{smallmatrix}O&NH_2\\&\\O_2N&O&NH_2\end{smallmatrix}$$ (anthraquinone structure)

are blended as in Example I with 35 parts of sodium ligninsulfonate, 0.4 part of sodium diisobutylnaphthalenesulfonate and 0.8 part of sodium diisobutyl carbinol diester of sulfosuccinate. Excellent cold water tests are obtained with the dye dispersed in this manner.

*Example IX*

Fifty parts of the dye of the formula:

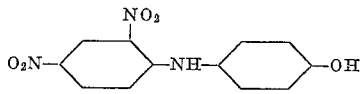

are blended as in Example I with 35 parts of sodium ligninsulfonate, 0.4 part of sodium diisobutylnaphthalenesulfonate and 0.8 part of sodium diisobutyl carbinol sulfosuccinate. Excellent cold water tests are obtained with the dye dispersed in this manner.

*Example X*

Fifty parts of the dye of the formula:

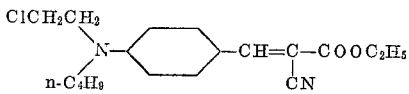

are blended as in Example I with 35 parts of sodium ligninsulfonate and 0.4 part of sodium diisobutylnaphthalenesulfonate and 0.8 part of sodium diisobutyl carbinol sulfosuccinate. Excellent cold water tests are obtained with the dye dispersed in this manner.

*Example XI*

Fifty parts of the dye of Example I were blended as in Example I with 35 parts of sodium ligninsulfonate, 2.5 parts of sodium diisobutylnaphthalene-sulfonate and 4 parts of sodium dioctyl sulfosuccinate. Excellent cold water tests are obtained with the dye dispersed in this manner.

In order to fully illustrate the present invention, the following example of a dyeing operation in accordance therewith is given:

*Example XII*

Equimolar parts of the dye of Example I and predispersed 3-hydroxy-2-napth-o-toluidide are combined and standardized with dextrin to a standard strength.

3 g. of this mixture is pasted with hot water and then made up to 1 l. with water.

10 g. of sodium p-phenylphenolate is dissolved in 100 cc. of water and 15 cc. of this is added to the dye solution. The pH is adjusted to 5.5–6 with acetic acid 28%. A 15 g. skein of Dacron polyester fiber is entered into the dyebath and boiled 45 min. followed by rinsing.

6% sulfuric acid (O.W.F.) and 8% sodium nitrite is dissolved in water and made up to 375 cc. The temperature is brought up to 140° F., the skeins entered and the temperature raised to 180–200° F. After 20 minutes the skein is removed and soaped for 20 minutes at the boil employing 2% soda and 2% of a commercial surfactant. A good black dyeing is obtained.

I claim:
1. A dispersed dye composition consisting essentially of a mixture of about 100 parts by weight of an insoluble dispersible acetate-type dyestuff and as a dispersing agent therefor, a mixture consisting essentially of 25 to 150 parts of a water-soluble ligninsulfonate dispersing agent, 0.5 to 8 parts of an alkyl naphthalene sulfonate and 0.5 to 8 parts of a dispersing agent selected from the group consisting of the alkyl esters of sulfo alkyl di- and tri-carboxylic acids.

2. A compoistion of matter for dispersing insoluble dispersible acetate-type dyestuffs to form dispersed dye compositions consisting essentially of a mixture in parts by weight of 25 to 150 parts of a water-soluble ligninsulfonate dispersing agent, 0.5 to 8 parts of an alkyl naphthalene sulfonate and 0.5 to 8 parts of a dispersing agent selected from the group consisting of the alkyl esters of sulfo alkyl di- and tri-carboxylic acids.

3. The method of dispersing insoluble dispersible acetate-type dyestuffs consisting essentially of intimately mixing in parts by weight about 100 parts of an insoluble dispersible acetate-type dyestuff, 25 to 150 parts of a water-soluble ligninsulfonate dispersing agent, 0.5 to 8 parts of an alkyl naphthalene sulfonate and 0.5 to 8 parts of a dispersing agent selected from the group consisting of the alkyl esters of sulfo alkyl di- and tri-carboxylic acids.

References Cited in the file of this patent

UNITED STATES PATENTS

| | | |
|---|---|---|
| 2,028,091 | Jaeger | Jan. 14, 1936 |
| 2,181,800 | Crossley | Nov. 28, 1939 |
| 2,768,054 | Armento et al. | Oct. 23, 1956 |
| 2,982,597 | Salvin et al. | May 2, 1961 |

OTHER REFERENCES

Schwartz et al.: Surface Active Agents and Detergents, vol. II, published 1958, pages 274–278. Published by Interscience Pub., Inc., N.Y.C.

UNITED STATES PATENT OFFICE
CERTIFICATE OF CORRECTION

Patent No. 3,153,564                       October 20, 1964

Jack F. Morgan

It is hereby certified that error appears in the above numbered patent requiring correction and that the said Letters Patent should read as corrected below.

Column 4, lines 9 to 17, the formula should appear as shown below instead of as in the patent:

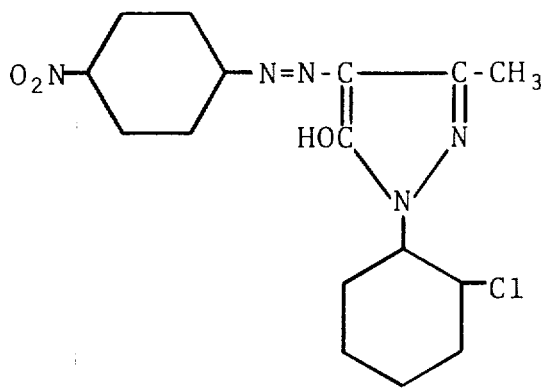

same column 4, lines 38 to 45, the formula should appear as shown below instead of as in the patent:

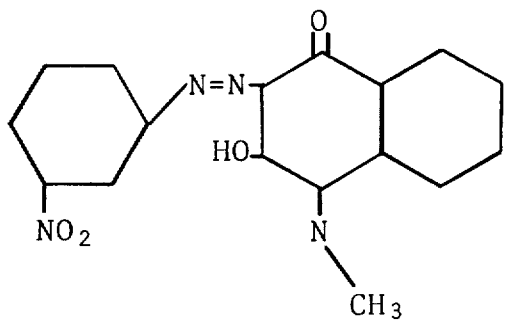

Signed and sealed this 13th day of July 1965.

(SEAL)
Attest:

ERNEST W. SWIDER                          EDWARD J. BRENNER
Attesting Officer                        Commissioner of Patents